(12) United States Patent
Han et al.

(10) Patent No.: US 7,863,522 B2
(45) Date of Patent: Jan. 4, 2011

(54) SEMI-CONDUCTING POLYMER COMPOSITIONS FOR THE PREPARATION OF WIRE AND CABLE

(75) Inventors: Suh Joon Han, Belle Mead, NJ (US); Scott H. Wasserman, Morganville, NJ (US); Mike S. Paquette, Midland, MI (US); David Pawlowski, Midland, MI (US); Robert C. Cieslinski, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 433 days.

(21) Appl. No.: 11/613,771

(22) Filed: Dec. 20, 2006

(65) Prior Publication Data

US 2008/0149363 A1    Jun. 26, 2008

(51) Int. Cl.
*H01B 1/00*    (2006.01)
*C08G 73/10*   (2006.01)

(52) U.S. Cl. ............... 174/102 SC; 252/511; 524/847; 977/742

(58) Field of Classification Search ................ 524/495, 524/496

See application file for complete search history.

(56) References Cited

U.S. PATENT DOCUMENTS

| 3,323,869 | A |   | 6/1967  | Olstowski        |
|-----------|---|---|---------|------------------|
| 3,333,941 | A |   | 8/1967  | Olstowski        |
| 3,404,061 | A |   | 10/1968 | Shane et al.     |
| 3,409,563 | A |   | 11/1968 | Olstowski        |
| 3,719,608 | A |   | 3/1973  | Olstowski        |
| 3,956,420 | A | * | 5/1976  | Kato et al. ............ 525/100 |
| 4,018,852 | A |   | 4/1977  | Schober          |
| 4,101,445 | A |   | 7/1978  | Levine et al.    |
| 4,286,023 | A |   | 8/1981  | Ongchin          |
| 4,302,565 | A |   | 11/1981 | Goeke et al.     |
| 4,508,842 | A |   | 4/1985  | Beran et al.     |
| 4,612,139 | A |   | 9/1986  | Kawasaki et al.  |
| 4,857,600 | A |   | 8/1989  | Gross et al.     |
| 4,937,299 | A |   | 6/1990  | Ewen et al.      |
| 4,971,726 | A | * | 11/1990 | Maeno et al. ............ 252/511 |
| 5,246,783 | A |   | 9/1993  | Spenadel et al.  |
| 5,272,236 | A |   | 12/1993 | Lai et al.       |

(Continued)

FOREIGN PATENT DOCUMENTS

EP    420 271 B1    12/1994

(Continued)

OTHER PUBLICATIONS

Randall, James C., A Review of High Resolution Liquid 13Carbon Nuclear Magnetic Resonance Characterizations of Ethylene-Based Polymers, JMS—Rev. Macromol. Chem. Phys., C29 (2 & 3), 201-317 (1989).

(Continued)

*Primary Examiner*—Patrick Ryan
*Assistant Examiner*—Brent Thomas
(74) *Attorney, Agent, or Firm*—Whyte Hirschboeck Dudek SC

(57) ABSTRACT

Compositions comprising a polyolefin polymer and an expanded graphite exhibit uniform conductivity over a broad range of temperature. In one embodiment, the polyolefin polymer is polypropylene or polyethylene homopolymer or a polypropylene or polyethylene copolymer. The compositions provide uniform conductivity and can be used as a conductive formulation for medium and high voltage cable components.

19 Claims, 1 Drawing Sheet

5 wt% 1000 m²/g expanded graphite in EVA copolymer

U.S. PATENT DOCUMENTS

| | | | |
|---|---|---|---|
| 5,278,272 A | 1/1994 | Lai et al. | |
| 5,317,036 A | 5/1994 | Brady, III et al. | |
| 5,332,793 A | 7/1994 | Cann | |
| 5,342,907 A | 8/1994 | Cann et al. | |
| 5,346,961 A | 9/1994 | Shaw et al. | |
| 5,371,145 A | 12/1994 | Daniell et al. | |
| 5,405,901 A | 4/1995 | Daniell et al. | |
| 5,410,003 A | 4/1995 | Bai | |
| 5,556,697 A | 9/1996 | Flenniken | |
| 5,575,965 A | 11/1996 | Caronia et al. | |
| 5,783,638 A | 7/1998 | Lai et al. | |
| 5,986,028 A | 11/1999 | Lai et al. | |
| 6,277,918 B1 * | 8/2001 | Collina et al. | 525/191 |
| 6,496,629 B2 | 12/2002 | Ma et al. | |
| 6,714,707 B2 | 3/2004 | Rossi et al. | |
| 7,623,340 B1 * | 11/2009 | Song et al. | 361/502 |
| 2005/0064177 A1 * | 3/2005 | Lee et al. | 428/323 |
| 2006/0148966 A1 | 7/2006 | Drzal et al. | |
| 2006/0186383 A1 * | 8/2006 | Matsuki et al. | 252/511 |
| 2006/0241237 A1 * | 10/2006 | Drzal et al. | 524/495 |
| 2007/0092432 A1 | 4/2007 | Prudhomme et al. | |

FOREIGN PATENT DOCUMENTS

| | | |
|---|---|---|
| WO | 03079472 A2 | 9/2003 |
| WO | 2007047084 A2 | 4/2007 |
| WO | WO 2007047084 A2 * | 4/2007 |

OTHER PUBLICATIONS

Modern Plastics Encyclopedia/89, Mid-Oct. 1988 issue, vol. 65, No. 11, p. 86-92.

Introduction to Polymer Chemistry, Stille, Wiley and Sons, New York, 1962, pp. 149-182.

* cited by examiner

FIGURE
5 wt% 1000 m$^2$/g expanded graphite in EVA copolymer

SEMI-CONDUCTING POLYMER COMPOSITIONS FOR THE PREPARATION OF WIRE AND CABLE

FIELD OF THE INVENTION

This invention relates to semi-conducting compositions comprising a polyolefin polymer and an expanded graphite. In one aspect, the invention relates to cables and wires. In another aspect, the invention relates to power cables comprising an insulation layer while in another aspect, the invention relates to power cables in which the insulation layer comprises a composition comprising a polyolefin polymer and an expanded graphite.

BACKGROUND OF THE INVENTION

A typical insulated electric power cable generally comprises one or more high potential conductors in a cable core that is surrounded by several layers of polymeric materials including a first semi-conductive shield layer (conductor or strand shield), an insulating layer (typically a nonconducting layer), a second semi-conductive shield layer (insulation shield), a metallic wire or tape shield used as the ground phase, and a protective jacket (which may or may not be semi-conductive). Additional layers within this construction such as moisture impervious materials are often incorporated.

A common means to achieve electrical conductivity is through the use of conductive carbon black in the polymeric formulations. Typically, carbon black loading in the semi-conductive polymer formulation ranges from 30 to 40 weight percent (wt %). The volume resistivity of these semi-conducting compounds is generally in the range of 10 to $10^5$ ohm-centimeter (ohm-cm) when measured on a completed power cable construction using 1 of the methods described in the Insulated Cables Engineers Association (ICEA) specification S-66-524 (1982). Polyolefin formulations such as these are disclosed in U.S. Pat. Nos. 4,286,023, 4,612,139, and 5,556,697 and European Patent 0 420 271. However, the high carbon black loading results in high viscosity and poor cleanliness. Lower carbon black loadings are desirable to improve the extrusion processability of the semi-conductive shields while maintaining high electrical conductivity.

Thus, there remains a need for a polymeric composition useful in the preparation of semi-conductive polymer compositions, which exhibits higher conductivity at a lower filler loading than conventional conductive carbon black.

SUMMARY OF THE INVENTION

In one embodiment, the present invention relates to semi-conducting compositions comprising a polyolefin polymer and expanded graphite (also known as nano-graphite). These semi-conducting compositions provide uniform conductivity over a broad range of temperature; preferably uniform conductivity is maintained from 15-160 C.

In another embodiment, the expanded graphite of the composition comprises a percentage of the total formulation including but not limited to about 0.1 to about 35 wt %, and preferably between about 1 to about 15 wt %. In another embodiment, the expanded graphite has a Brunauer, Emmett and Teller (BET) surface area greater than 40 square meters per gram ($m^2/g$).

In another embodiment, the present invention relates to a power cable comprising an semi-conductive shield layer in which the shield layer comprises a polyolefin polymer and an expanded graphite composition.

In another embodiment, the present invention is a semi-conductive composition comprising (i) a polyolefin polymer, and (ii) about 1 to about 15 wt %, based on the weight of the composition, of an expanded graphite having a BET surface area greater than 40 $m^2/g$. The semi-conducting composition provides uniform conductivity.

BRIEF DESCRIPTION OF THE DRAWINGS

The FIGURE is a micrograph of a five weight percent, 1000 $m^2/g$ expanded graphite in ethylene vinyl acetate copolymer.

DESCRIPTION OF THE PREFERRED EMBODIMENTS

"Cable," "power cable," and like terms mean at least one wire or optical fiber within a protective jacket or sheath. Typically, a cable is two or more wires or optical fibers bound together, typically in a common protective jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Polymer" means a polymeric compound prepared by polymerizing monomers, whether of the same or a different type. The generic term polymer thus embraces the term homopolymer, usually employed to refer to polymers prepared from only one type of monomer, and the term copolymer as defined below.

"Copolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Expanded graphite", "nano-graphite" and like terms mean graphite that does not have any significant order as evidenced by an x-ray diffraction pattern. Expanded graphite has been treated to increase the inter-planar distance between the individual layers that make up the graphite structure.

In one embodiment, the present invention relates to compositions comprising a polyolefin polymer, or a blend comprising a polyolefin polymer, and an expanded graphite. In another embodiment, the present invention relates to compositions comprising polyolefin polymers or its blends and expanded nano-graphites from about 0.1 to about 35 wt % based on the total weight of the total formulations, preferably the expanded nano-graphites comprise about 1 to 15 wt % of the total formulations. In yet still another embodiment, the expanded graphites may further comprise aggregates of nano or micro or larger size of the polymer matrix. In another embodiment, the expanded graphites of the composition have a BET surface area greater than 250 $m^2/g$. In another embodiment, the nano-graphites may contain functional groups including but not limited to hydroxyl, carboxylic, amine, epoxide, silane, alkyl, and vinyl and any other group that can enhance the compatibilization with the polymer matrix.

The expanded graphite typically has a BET surface area of at least 10, more typically at least 40, preferably at least 250, and more preferably at least 500, m$^2$/g. The upper surface area limit of the expanded graphite may, in principle, be as high as about 2700 m$^2$/g which approximates the theoretical surface of fully expanded graphite. However, the typical maximum surface area for expanded graphite is 1500, more typically 1000, m$^2$/g.

For purposes of this invention, the BET surface area measurement can be made using 30% nitrogen in helium at a P/Po ratio of 0.3. Any one of a number of commercially available devices can be used to make the measurement including but not limited to the Micromeritics TRISTAR 3000 instrument and the Quantachrome Monosorb instrument. Samples are suitably out-gassed prior to making the measurement. Suitable conditions include a temperature of 200 C and atmospheric pressure.

The polyolefin polymer can comprise at least one resin or its blends having melt index (MI, I$_2$) from about 0.1 to about 50 grams per 10 minutes (g/10 min) and a density between 0.85 and 0.95 grams per cubic centimeter (g/cc). Typical polyolefins include high pressure low density polyethylene, high density polyethylene, linear low density polyethylene metallocene linear low density polyethylene, and constrained geometer catalyst (CGC) ethylene polymers. Density is measured by the procedure of ASTM D-792 and melt index is measured by ASTM D-1238 (190 C/2.16 kg).

In another embodiment, the polyolefin polymer includes but is not limited to copolymers of ethylene and unsaturated esters with an ester content of at least about 5 wt % based on the weight of the copolymer. The ester content is often as high as 80 wt %, and, at these levels, the primary monomer is the ester.

In still another embodiment, the range of ester content is about 10 to about 40 wt %. The percent by weight is based on the total weight of the copolymer. Examples of the unsaturated esters are vinyl esters and acrylic and methacrylic acid esters. The ethylene/unsaturated ester copolymers usually are made by conventional high pressure processes. The copolymers can have a density in the range of about 0.900 to 0.990 g/cc. In yet another embodiment, the copolymers have a density in the range of 0.920 to 0.950 g/cc. The copolymers can also have a melt index in the range of about 1 to about 100 g/10 min. In still another embodiment, the copolymers can have a melt index in the range of about 5 to about 50 g/10 min.

The ester can have 4 to about 20 carbon atoms, preferably 4 to about 7 carbon atoms. Examples of vinyl esters are: vinyl acetate; vinyl butyrate; vinyl pivalate; vinyl neononanoate; vinyl neodecanoate; and vinyl 2-ethylhexanoate. Examples of acrylic and methacrylic acid esters are: methyl acrylate; ethyl acrylate; t-butyl acrylate; n-butyl acrylate; isopropyl acrylate; hexyl acrylate; decyl acrylate; lauryl acrylate; 2-ethylhexyl acrylate; lauryl methacrylate; myristyl methacrylate; palmityl methacrylate; stearyl methacrylate; 3-methacryloxypropyltrimethoxysilane; 3-methacryloxypropyltriethoxysilane; cyclohexyl methacrylate; n-hexylmethacrylate; isodecyl methacrylate; 2-methoxyethyl methacrylate: tetrahydrofurfuryl methacrylate; octyl methacrylate; 2-phenoxyethyl methacrylate; isobornyl methacrylate; isooctylmethacrylate; isooctyl methacrylate; and oleyl methacrylate. Methyl acrylate, ethyl acrylate, and n- or t-butyl acrylate are preferred. In the case of alkyl acrylates and methacrylates, the alkyl group can have 1 to about 8 carbon atoms, and preferably has 1 to 4 carbon atoms. The alkyl group can be substituted with an oxyalkyltrialkoxysilane.

Other examples of polyolefin polymers are: polypropylene; polypropylene copolymers; polybutene; polybutene copolymers; highly short chain branched α-olefin copolymers with ethylene co-monomer less than about 50 mole percent to about 0 mole percent; polyisoprene; polybutadiene; EPR (ethylene copolymerized with propylene); EPDM (ethylene copolymerized with propylene and a diene such as hexadiene, dicyclopentadiene, or ethylidene norbornene); copolymers of ethylene and an α-olefin having 3 to 20 carbon atoms such as ethylene/octene copolymers; terpolymers of ethylene, α-olefin, and a diene (preferably non-conjugated); terpolymers of ethylene, α-olefin, and an unsaturated ester; copolymers of ethylene and vinyl-tri-alkyloxy silane; terpolymers of ethylene, vinyl-tri-alkyloxy silane and an unsaturated ester; or copolymers of ethylene and one or more of acrylonitrile or maleic acid esters. In yet another embodiment of the invention, the polyolefin polymer is ethylene ethyl acrylate.

In another embodiment, the polyolefin polymer can be a homopolymer or one or more copolymers of units derived from propylene and up to about 50, preferably up to about 30 and more preferably up to about 20, mole percent ethylene and/or one or more other α-olefin having up to about 20, preferably up to 12 and more preferably up to 8, carbon atoms. If a copolymer, it can be random, block or graft. The molecular weight of the polypropylene is conveniently indicated using a melt flow measurement according to ASTM D-1238, Condition 230 C/2.16 kg (formerly known as "Condition (L)" and also known as 12). Melt flow rate is inversely proportional to the molecular weight of the polymer. Thus, the higher the molecular weight, the lower the melt flow rate, although the relationship is not linear. The melt flow rate for the polypropylene useful in the practice of this invention is generally between about 0.1 and 40, and more preferably between about 1 and 40. Exemplary polypropylenes useful in the practice of this invention include the VERSIFY® polymers available from The Dow Chemical Company, and the VISTAMAXX® polymers available from ExxonMobil Chemical Company. A complete discussion of various polypropylene polymers is contained in *Modern Plastics Encyclopedia*/89, mid October 1988 Issue, Volume 65, Number 11, pp. 86-92.

In one embodiment, the polyolefin polymers are produced in the gas phase. In another embodiment, the polyolefin polymers can be produced in the liquid phase in solutions or slurries by conventional techniques. In yet another embodiment, the polyolefin polymers can be produced by high pressure or low pressure processes. Low pressure processes are typically run at pressures below 7 MegaPascals (MPa) whereas high pressure processes are typically run at pressures above 100 MPa.

Various catalyst systems can be used to prepare the polyolefin polymers used in the practice of this invention including but not limited to magnesium/titanium based catalyst systems, which can be exemplified by the catalyst system described in U.S. Pat. No. 4,302,565; vanadium based catalyst systems such as those described in U.S. Pat. Nos. 4,508,842, 5,332,793, 5,342,907, and 5,410,003, a chromium based catalyst system such as that described in U.S. Pat. No. 4,101,445, a metallocene catalyst system such as that described in U.S. Pat. Nos. 4,937,299 and 5,317,036, or other transition metal catalyst systems. Many of these catalyst systems are often referred to as Ziegler-Natta catalyst systems. Polyolefin copolymers that are made with a single site catalyst such as a metallocene catalyst or constrained geometry catalyst, typically have a melting point of less than about 95, preferably less than about 90, more preferably less than about 85, even more preferably less than about 80 and still more preferably less than about 75, C.

In another embodiment, for polyolefin copolymers made with multi-site catalysts, e.g., Ziegler-Natta and Phillips catalysts, the melting point is typically less than about 125, preferably less than about 120, more preferably less than about 115 and even more preferably less than about 110, C. The melting point is measured by differential scanning calorimetry (DSC) as described, for example, in U.S. Pat. No. 5,783, 638.

In another embodiment, the polyolefin polymers can be produced using catalyst systems, which use chromium or molybdenum oxides on silica-alumina supports. Typical in situ polymer blends and processes and catalyst systems are described in U.S. Pat. Nos. 5,371,145 and 5,405,901. A conventional high pressure process is described in *Introduction to Polymer Chemistry*, Stille, Wiley and Sons, New York, 1962, pages 149 to 151.

In yet another embodiment, the polyolefin polymer comprises a blend of a polypropylene and an elastomer, wherein the elastomer is polyolefin copolymer with a density of less than about 0.90, preferably less than about 0.89, more preferably less than about 0.885, even more preferably less than about 0.88 and even more preferably less than about 0.875, g/cc. The elastomeric polyolefin copolymer typically has a density greater than about 0.85, and more preferably greater than about 0.86, g/cc. Low density elastomeric polyolefin copolymers are generally characterized as amorphous, flexible and having good optical properties, e.g., high transmission of visible and UV-light and low haze.

While any elastomeric polyolefin copolymer can be used in the practice of this invention, preferred elastomeric polyolefin copolymers are made with a single site catalyst, such as a metallocene catalyst or constrained geometry catalyst, typically have a melting point of less than about 95, preferably less than about 90, more preferably less than about 85, even more preferably less than about 80 and still more preferably less than about 75, C.

The elastomeric polyolefin copolymers useful in the practice of this invention include ethylene/α-olefin interpolymers having a α-olefin content of between about 15, preferably at least about 20 and even more preferably at least about 25, wt % based on the weight of the interpolymer. These interpolymers typically have an α-olefin content of less than about 50, preferably less than about 45, more preferably less than about 40 and even more preferably less than about 35, wt % based on the weight of the interpolymer. The α-olefin content is measured by $^{13}$C nuclear magnetic resonance (NMR) spectroscopy using the procedure described in Randall (*Rev. Macromol. Chem. Phys.*, C29 (2&3)). Generally, the greater the α-olefin content of the interpolymer, the lower the density and the more amorphous the interpolymer, and this translates into desirable physical and chemical properties for the protective insulation layer.

The α-olefin is preferably a $C_{3-20}$ linear, branched or cyclic α-olefin. The term interpolymer refers to a polymer made from at least two monomers. It includes, for example, copolymers, terpolymers and tetrapolymers. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

The elastomeric polyolefin copolymers useful in the practice of this invention have a Tg of less than about −20, preferably less than about −40, more preferably less than about −50 and even more preferably less than about −60, C as measured by differential scanning calorimetry (DSC) using the procedure of ASTM D-3418-03. Moreover, typically the elastomeric polyolefin copolymers used in the practice of this invention also have a melt index of less than about 100, preferably less than about 75, more preferably less than about 50 and even more preferably less than about 35, g/10 minutes. The typical minimum MI is about 1, and more typically it is about 5.

More specific examples of elastomeric olefinic interpolymers useful in this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), and homogeneously branched, substantially linear ethylene/α-olefin polymers (e.g., AFFINITY® and ENGAGE® polyethylene available from The Dow Chemical Company). The more preferred elastomeric polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The compositions of the present invention also comprise an expanded nano-graphite. Exfoliated graphite is a form of expanded graphite where the individual platelets are separated by heating with or without an agent such as a polymer or polymer component. The expanded nano-graphite can be blended with one or more conductive fillers, e.g., carbon black, carbon nano-tube, carbon fiber, fullerene, conductive polymers such as polyacetylene, polyparaphenylene, polypyrrole, polythiophene and polyaniline. The expanded graphite typically comprises between about 0.1 to 35, more typically between about 1 to 15 and even more typically between about 1 to 10, percent of the total weight of the composition.

A common conventional method for forming expandable graphite particles is described in U.S. Pat. No. 3,404,061. The starting material is a natural graphite flake that is processed to a minimum level of purity of 99.9% LOI (loss on ignition), with the particle size of the graphite being between about −20 mesh and +60 mesh and, preferably between 30 mesh and 70 mesh (200-600 microns). A natural flake graphite can be obtained from the Superior Graphite Co. of Chicago, Ill., as 2901 grade graphite. However, one of ordinary skill in the art will understand that the minimum level of purity of the starting material is dependent upon the ultimate use of the delaminated, exfoliated graphite product that results from the method.

The graphite flake is intercalated by dispersing flakes in a solution containing an oxidizing agent and oxidizing mixtures, including but not limited to a mixture of nitric and sulfuric acid, solutions containing nitric acid, potassium chlorate, chromic acid, potassium permanganate, potassium chromate, potassium dichromate, perchloric acid, and the like, or mixtures, including but not limited to concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. After the flakes are intercalated, excess solution is drained from the flakes. The quantity of intercalation solution retained on the flakes after draining is typically greater than 100 parts of solution by weight per 100 parts by weight of graphite flakes (pph) and more typically about 100 to 150 pph.

In one embodiment, the intercalant is a solution of sulfuric acid, or sulfuric acid and phosphoric acid, and an oxidizing agent, for example, nitric acid, perchloric acid, chromic acid, potassium permanganate, iodic or periodic acids, or the like. In another embodiment, the intercalant may contain metal halides such as ferric chloride, and ferric chloride mixed with sulfuric acid, or a halogen, such as bromine as a solution of bromine and sulfuric acid or bromine in an organic solvent.

In yet another embodiment, the particles of graphite flake treated with intercalant are contacted by blending, with a reducing organic agent including but not limited to alcohols, sugars, aldehydes and esters that are reactive with the surface film of oxidizing intercalating solution at temperatures in the range of 25-110 C. Suitable specific organic agents include but are not limited to the following: hexadecanol, octadecanol, 1-octanol, 2-octanol, decylalcohol, 1,10-decanediol, decylaldehyde, 1-propanol, 1,3-propanediol, ethyleneglycol, dextrose, lactose, sucrose, potato starch, ethylene glycol monostearate, diethylene glycol dibenzoate, propylene glycol monostearate, and glycerol monostearate. The amount of organic reducing agent is suitably from about 0.75 to 4% wt % based on the weight of the particles of graphite flake.

Following the blending of the intercalant coated intercalated graphite flake with the organic reducing agent, the blend is exposed to temperatures in the range of 25 to 110 C to promote reaction of the reducing agent and intercalant coating. The heating period is from about 20 hours to one-half hour with shorter heating periods for higher temperatures in the above-noted range. The volatile content after intercalation is preferably between about 12 to 22 wt %. One example of intercalated graphite is GRAFGUARD acid-treated chemical flake graphite from UCAR Carbon Company, of Danbury, Conn., which is natural graphite intercalated with sulfuric acid and nitric acid.

Upon exposure to high temperature (typically in the range of 600 to 1200 C), the particles of intercalated graphite expand in dimension as much as 80 to 1000 or more times its original volume in an accordion-like fashion in the c-direction, i.e. in the direction perpendicular to the crystalline planes of the graphite. Such heating may be done any number of ways including but not limited to directly heating the intercalated graphite with a flame, by placing the intercalated graphite in on a hot surface, by using infra-red heating elements, by inductive heating, or the like.

In another embodiment, microwave energy or RF induction heating provides a method to produce expanded graphite nanoflakes, graphite nanosheets, or graphite nanoparticles. The microwave or RF methods can be useful in large-scale production and can be cost-effective. The chemically intercalated graphite flakes can be expanded by application of the RF or microwave energy. Typically, heating for 3 to 5 minutes removes the expanding chemical, but this heating period will depend upon, among other things, the chemical. The graphite absorbs the RF or microwave energy quickly without being limited by convection and conduction heat transfer mechanisms. The intercalant heats beyond the boiling point and causes the graphite to expand to many times its original volume. The process can be performed continuously by using a commercially available induction or microwave system with conveyors.

In another embodiment, a microwave oven, radio frequency (induction heating) or microwave frequency energy across a wide range can be used for expansion. In yet another embodiment, a commercial microwave oven operating at 2.45 gigahertz (GHz) can be used for expansion. This process can be done continuously by using a commercially available microwave system with conveyors. After the expansion, the graphite material is calendared, with or without binder resins, to form a flexible graphite sheet. The resultant sheet can be cut into various sizes and shapes.

In yet another embodiment, the combination of RF or microwave expansion and appropriate grinding technique, such as planetary ball milling (and vibratory ball milling), can be used to produce nanoplatelet graphite flakes with a high aspect ratio efficiently. Microwave or RF expansion and pulverization of the crystalline graphite to produce suitable graphite flakes enables control of the size distribution of graphite flakes more efficiently. By incorporating an appropriate surface treatment, the process offers an economical method to produce a surface treated expanded graphite.

In yet another embodiment, the expanded graphite is pulverized by, for instance, ball milling, mechanical grinding, air milling, or ultrasonic wave to produce graphite flakes (platelets) with high aspect ratio. Commercially available expandable graphite flake product is available from UCAR Carbon Company Inc (Danbury, Conn.). Another commercially available expandable graphite flake (the Nord-Min® series expandable graphite) is available from Nyacol, Inc. (Ashland, Mass.). For the Nord-Min series, the expandable graphite has the following characteristics: purity from 92-99%; pH-value from 6.0-7.5; particle size from +32-mesh to −200-mesh; expansion volume up to 350 ml/g; expansion strength up to 95 mm; and start expansion temperature from 150 to 300 C.

In another embodiment, the compositions of the present invention comprising a polyolefin polymer and an expanded graphite can also comprise conventional additives including but not limited to antioxidants, curing agents, crosslinking co-agents, boosters and retardants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives can be used in amounts ranging from less than about 0.01 to more than about 10 wt % based on the weight of the composition.

Examples of antioxidants are as follows, but are not limited to: hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-demthylbenzyl)diphenylamine, diphenyl-p-phenylenediamine, mixed di-aryl-p-phenylenediamines, and other hindered amine antidegradants or stabilizers. Antioxidants can be used in amounts of about 0.1 to about 5 wt % based on the weight of the composition.

Examples of curing agents are as follows: dicumyl peroxide; bis(alpha-t-butyl peroxyisopropyl)benzene; isopropylcumyl t-butyl peroxide; t-butylcumylperoxide; di-t-butyl peroxide; 2,5-bis(t-butylperoxy)2,5-dimethylhexane; 2,5-bis(t-butylperoxy)2,5-dimethylhexane-3; 1,1-bis(t-butylperoxy)3, 3,5-trimethylcyclohexane; isopropylcumyl cumylperoxide; di(isopropylcumyl) peroxide; or mixtures thereof. Peroxide curing agents can be used in amounts of about 0.1 to 5 wt % based on the weight of the composition. Various other known curing co-agents, boosters, and retarders, can be used, such as triallyl isocyanurate; ethoxylated bisphenol A dimethacrylate; alpha methyl styrene dimer; and other co-agents described in U.S. Pat. Nos. 5,346,961 and 4,018,852.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or n,n'-ethylenebisstearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of about 0.05 to about 5 wt % based on the weight of the composition.

Examples of fillers include but are not limited to clays, precipitated silica and silicates, fumed silica calcium carbonate, ground minerals, and carbon blacks with arithmetic mean particle sizes larger than 15 nanometers. Fillers can be used in amounts ranging from less than about 0.01 to more than about 50 wt % based on the weight of the composition.

Compounding of a semi-conducting material can be effected by standard means known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of a semiconducting material such as viscosity, volume resistivity, and extruded surface smoothness.

A cable containing a semi-conducting composition of a polyolefin polymer and an expanded graphite can be prepared in various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating where the polymeric insulation is crosslinked after extrusion, the cable often passes immediately into a heated vulcanization zone downstream of the extrusion die. The heated cure zone can be maintained at a temperature in the range of about 200 to about 350 C, preferably in the range of about 170 to about 250 C. The heated zone can be heated by pressurized steam, or inductively heated pressurized nitrogen gas.

The following examples further illustrate the invention.

SPECIFIC EMBODIMENTS

Example 1

Compositions are prepared using a Brabender mixing bowl at 130 C at 20 rpm for 5 minutes. A master batch of ethylene ethyl acrylate (EEA) copolymer with 20 wt % of nano-graphite from TIMCAL Graphite and Carbon is used to prepare three other compositions. The first composition (referred to as the 12 wt % nano-graphite composition) comprises 39% EEA copolymer at 20 MI, 60% EEA copolymer with 20 wt % of nano-graphite, and 1% polymerized di-hydro-trimethyl quinoline. The 12 wt % nano-graphite composition comprises 12 wt % of the nano-graphite in the total formulation. The second composition (referred to as the 16 wt % nano-graphite composition) comprises 19% EEA copolymer at 20 MI, 80% EEA copolymer with 20 wt % of nano-graphite, and 1% polymerized di-hydro-trimethyl quinoline. The 16 wt % nano-graphite composition comprises 16 wt % of the nano-graphite in the total formulation. The third composition (referred to as the 38 wt % of carbon black composition) comprises 61% EEA copolymer (20M), 38% Denka Acetylene black from Denka Corporation, and 1% polymerized di-hydro trimethyl quinoline.

The 12 wt % nano-graphite composition is mixed with dicumyl peroxide for a final formulation of 98.2% of 12 wt % nano-graphite composition and 1.8% dicumyl peroxide. The 16 wt % nano-graphite composition is mixed with dicumyl peroxide for a final formulation of 98.2% of 16 wt % nano-graphite composition and 1.8% dicumyl peroxide. The 38 wt % of carbon black composition is mixed with dicumyl peroxide for a final formulation of 98.7% of 38 wt % of the carbon black composition and 1.3% dicumyl peroxide. A summary of the formulation of the compositions is provided in Table I.

TABLE 1

A Summary of the Conductive Compositions Tested

|  | 12 wt % nano-graphite composition | 16 wt % nano-graphite composition | 38 wt % Carbon Black |
|---|---|---|---|
| EEA copolymer (20MI) | 39 | 19 | 61 |
| EEA copolymer with 20 wt % of nano-graphites | 60 | 80 | 0 |
| Polymerized di-hydro trimethyl quninoline | 1 | 1 | 1 |
| Denka Acetylene Black | 0 | 0 | 38 |
| Total Intermediate | 100 | 100 | 100 |
| Intermediate | 98.2 | 98.2 | 98.7 |
| Dicumyl Peroxide | 1.8 | 1.8 | 1.3 |

Single plaques are prepared from the semiconductive formulation by compression molding. Prior to compression molding the formulations are melted on a two-roll mill. Organic peroxide is added if crosslinking is desired. The first step of the compression molding is the regular pressing at 120 C under 2000 psi pressure for 5 minutes, followed by 25 tons of pressure for 5 minutes, and then the plaque is cooled. The second step of the compression molding is crosslinking at 185 C under 25 tons of pressure for 25 minutes, again followed by cooling. The dimensions of the plaques are as follows: total length of 4 inches, width of 1 inch, and thickness of 125 mil.

Silver paint is applied at the points that are 1 inch from each end of the plaque to provide better contact with the electrodes of an ohm-meter. The distance between the silver paint lines is 2 inches (L). The resistance R is measured with an ohm-meter at the given temperature in a convection air oven. The volume resistivity is calculated by the equation:

$$\text{Volume resistivity} = \frac{R \times W \times T}{L}$$

Two specimens are tested for each semiconductive formulation. The volume resistivity is measured at a range of temperatures from room temperature (23 C) to 150 C. A summary of the measured resistivity for each composition at each temperature is provided in Table 2.

TABLE 2

Volume Resistivity for the Nano-Graphite Polyolefin Compositions

| Temperature (C.) | 12 wt % Nano-Graphite Composition (ohm-cm) | 16 wt % Nano-Graphite Composition (ohm-cm) | 38 wt % of Carbon Black (ohm-cm) |
|---|---|---|---|
| 23 | 254 | 30 | 671 |
| 30 | 251 | 30 | 680 |
| 50 | 253 | 30 | 1047 |
| 70 | 246 | 30 | 2174 |
| 90 | 231 | 29 | 11639 |
| 110 | 201 | 26 | 34789 |
| 130 | 152 | 21 | 19669 |
| 150 | 127 | 19 | 6949 |

The nano-graphite compositions exhibit uniform conductivity behavior over a broad range of temperatures. The compositions with the polyolefin polymer and the nano-graphites exhibit higher conductivity at a lower filler loading than conventional carbon black loading. The 38 wt % of carbon black composition exhibits a strong positive temperature coefficient effect (ratio of volume resistivity at operation temperature/volume resistivity at room temperature).

The polyolefin polymer and the nano-graphite compositions effectively lower the loading while maintaining the electrical conductivity. Furthermore, the compositions with the polyolefin polymer and the expanded nano-graphites improve the extrusion processability due to a lower filler loading in semi-conductive shield compositions and uniform conductivity over a broad temperature range. The compositions with the polyolefin polymer and the nano-graphites are useful for wire and cable applications. The compositions provide uniform conductivity and can be used as a conductive formulation for medium and high voltage cable components.

Example 2

Expanded graphite with a BET surface area of 1000 m$^2$/g is produced using the Staudenmaier method. Carefully, 0.1 grams of this highly expanded graphite is weighed in a 250 ml jar in which 100 ml of toluene solvent is added. The solvent mixture is then sonicated in a water bath for 20 hours to breakup the expanded graphite worms into platelets. In a separate flask, 1.9 grams of ethylene vinyl acetate copolymer is dissolved on a hot plate at 10° C. with stirring in an additional 100 ml of toluene. After the resin is completely dissolved, the solution is added to the sonicated graphite solution and continued sonicated at 80 C for additional twenty minutes. The solution is then allowed to cool and the solvent removed by roto-evaporation. The remaining resin is dried in a vacuum oven overnight at 60 C.

This powder is then pressed into a disk using a Leco hot press at 150 C and 10 Newton pressure for 2 minutes. A bar is cut from the disk, and the ends fractured at liquid nitrogen temperature to expose a new surface at the edge of the bar. The freshly exposed edge is coated with silver paint and allowed to dry for one hour. The resistivity along the length of the bar is then measured using an ohm-meter, and the volume resistivity calculated. The sample has a volume resistivity of 396 ohm/cm at 23 C. A micrograph of the expanded graphite in the EVA is shown in the FIGURE.

Although the invention has been described in considerable detail through the preceding examples, this detail is for the purpose of illustration and is not to be construed as a limitation on the invention as described in the following claims. All references including but not limited to U.S. patents and allowed U.S. patent applications or published U.S. patent applications are incorporated within this specification by reference.

What is claimed is:

1. A composition comprising a polyolefin polymer, a carbon black, and an expanded graphite having a BET surface area of at least 250 m$^2$/g to about 1500 m$^2$/g.

2. The composition of claim 1 in which polyolefin polymer is a polypropylene homopolymer or a polyethylene homopolymer.

3. The composition of claim 1 in which the polyolefin polymer is a polypropylene copolymer comprising at least about 50 mole percent units derived from propylene and the remainder from units derived from at least one α-olefin comprising up to about 20 carbon atoms.

4. The composition of claim 1 in which the polyolefin polymer is a polyethylene copolymer comprising at least about 50 mole percent units derived from ethylene and the remainder from units derived from at least one α-olefin having up to 20 carbon atoms.

5. The composition of claim 1 wherein the expanded graphite is dispersed in an ethylene vinyl acetate resin.

6. The composition of claim 1 in which the polyolefin polymer is linear low density polyethylene.

7. The composition of claim 1 wherein the carbon black is present in an amount from less than about 0.01 wt % to about 50 wt % of the composition.

8. The composition of claim 1 in which the expanded graphite comprises between about 0.1 and 35 percent of the total weight of the composition.

9. The composition of claim 1 in which the composition provides uniform conductivity over a temperature range of 15-160 C.

10. A power cable comprising a semi-conductive shield layer in which the shield layer comprises a polyolefin polymer, a carbon black, and an expanded graphite having a BET surface area of at least 250 m$^2$/g to about 1500 m$^2$/g.

11. The power cable of claim 10 in which the polyolefin polymer is a polypropylene homopolymer or a polyethylene homopolymer.

12. The power cable of claim 10 in which the polyolefin polymer is a polypropylene copolymer comprising at least about 50 mole percent units derived from propylene and the remainder from units derived from at least one α-olefin comprising up to about 20 carbon atoms.

13. The power cable of claim 10 in which the polyolefin polymer is a polyethylene copolymer comprising at least about 50 mole percent units derived from ethylene and the remainder from units derived from at least one α-olefin having up to 20 carbon atoms.

14. The power cable of claim 10 in which the expanded graphite comprises between about 1 and 15 percent of the total weight of the composition.

15. The power cable of claim 10 in which the semi-conductive shield layer provides uniform conductivity over a temperature range of 15-160 C.

16. A semi-conducting composition comprising (i) a polyolefin polymer and (ii) about 1 to about 15 wt %, based on the weight of the composition of an expanded graphite having a BET surface area greater than 250 $m^2/g$, and (iii) carbon black.

17. The composition of claim 1 in which the polyolefin polymer comprises ethylene and at least one unsaturated ester of 4 to about 20 carbon atoms, and the ester is present in an amount of about 10 to about 60 percent by weight.

18. The composition of claim 1 comprising an antioxidant.

19. The composition of claim 18 wherein the antioxidant is a quinoline.

* * * * *